No. 819,625. PATENTED MAY 1, 1906.
E. ZELL.
ELECTRIC MUFFLE.
APPLICATION FILED OCT. 28, 1902.
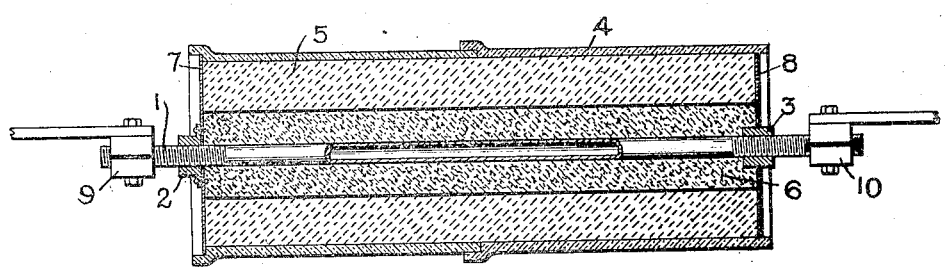
Witnesses.
Inventor.
Erland Zell,
by
Atty.

UNITED STATES PATENT OFFICE.

ERLAND ZELL, OF SCHENECTADY, NEW YORK, ASSIGNOR TO GENERAL ELECTRIC COMPANY, A CORPORATION OF NEW YORK.

ELECTRIC MUFFLE.

No. 819,625. Specification of Letters Patent. Patented May 1, 1906.

Application filed October 28, 1902. Serial No. 129,132.

*To all whom it may concern:*

Be it known that I, ERLAND ZELL, a subject of the King of Sweden and Norway, residing at Schenectady, county of Schenectady, State of New York, have invented certain new and useful Improvements in Electric Muffles, of which the following is a specification.

Iron forms a very desirable substance from which to construct the walls of muffles or furnaces which are to be heated by the passage of electricity through such walls. When so constructed, however, without provision being made for protecting the walls of the furnace, they deteriorate rapidly. This deterioration is due principally to the oxidation of the iron, which takes place almost entirely from the outer surface inward. This oxidation may be done away with if the iron be kept in an inclosed space to which no air or other gas-containing oxygen is admitted. The construction, however, of such an inclosing chamber is not simple, owing largely to the difficulty caused by the expansion of the heated iron at any joints which may be made. The use of carbon, charcoal, or the like as a packing for the tube to reduce the oxidation has the disadvantage that it "cements" the iron, and thereby reduces its melting-point.

I have found that if the iron heating-chamber be packed in or surrounded by some carbid oxidation will not take place nor will the iron be affected by the carbid. The carbid which I prefer to employ is granular calcium carbid. The action of the heated chamber upon the calcium-carbid packing in the presence of any air which may come in through the packing is principally to produce carbon monoxid and calcium oxid. The calcium oxid which is formed has a very high melting-point, and since it is entirely free from moisture adds to the efficiency of the combination. The carbon monoxid, owing to its high powers as a reducing agent, also helps materially to protect the tube. With such a packing an iron-chamber furnace can be run at a temperature of about 1,100° centigrade and the life of the chamber is of considerable duration. In the use of my invention it may become necessary to renew the calcium carbid employed from time to time. The intervals between renewals, however, will be of considerable duration.

For a better understanding of my invention reference may be had to the accompanying drawings, in which I have illustrated one embodiment of my invention. An elongated iron tube 1 forms the heating-chamber proper of the furnace. This tube may be a section of iron pipe and is preferably threaded at the ends, as shown. On these threaded ends are screwed heavy nuts 2 and 3. A casing 4 surrounds the tube 1. This casing is shown in the drawings as made of sections of vitrified or other earthenware pipe. Within the casing a layer or lining 5 of suitable heat-insulating material, such as lime or asbestos, is placed, and within this heat-insulating lining and surrounding the tube is placed a packing 6 of granular calcium carbid or other carbid. Dry calcium oxid may be mixed with the calcium carbid, if desired. A layer of paper may be employed to separate the lime from the calcium carbid.

End pieces 7 and 8 are placed at each end of the casing and serve to retain the lining of lime or asbestos and the packing in place. The nut 2 is shown as secured to the outer side of the end plate 7, which is apertured centrally to receive the tube 1. The other end plate 8 is also provided with a central aperture; but this aperture is made large enough to receive the nut 3, which is slidingly fitted therein. The end plates 7 and 8 are preferably made of sheet-iron, so as to have substantially the same ratio of expansion as the nuts 2 and 3 and the pipe 1. The longitudinal expansion of the pipe 1 takes place without any injurious effect upon the casing by reason of the sliding connections between the nut 3 and the end plate 8. Suitable terminals 9 and 10 are clamped onto the ends of the rod 1. These terminals should be flexibly connected to some source of electric current.

The article which it is desired to heat having been placed in the hollow tube 1, current is passed through the tube between the terminals 9 and 10. This heats the tube and any article which may be placed therein. The degree of heat attained is dependent upon the amount of current used and the resistance of the tube.

The casing 4 may well be made of sewer or drain pipe, as shown. Any other suitable material can be employed, however. Where alternating currents are employed to heat the tube 1, the use of iron or steel to form a casing is objectionable.

Though a section of tubing forms a desirable heating-chamber, other forms are included within the spirit of my invention. By the use of the term "iron" in the specification and claims I intend to cover generically the various forms of iron and steel. In place of using iron or steel tubing it may sometimes be desirable to use tubes formed out of other metals packed in the material described. For instance, nickel may sometimes be employed as a substance out of which to make the tube, as by using it the temperature at which such a furnace can be worked will be increased somewhat.

While I have illustrated and described the best form of my invention which is now known to me, I do not consider my invention in its broader aspects to be limited to the details shown and described, as they do not form essential features of my invention.

What I claim as new, and desire to secure by Letters Patent of the United States, is—

1. In a furnace, an iron heating member and a heat-insulating packing therefor, containing calcium carbid in granular form.

2. In a furnace, an iron heating-chamber, means for introducing material to be heated within said chamber, means for connecting said chamber to a source of current and a packing surrounding said chamber and containing a carbid.

3. In a furnace, an iron heating-chamber, means for introducing material to be heated within said chamber, means for heating said chamber and a packing surrounding said chamber and in contact therewith, said packing containing calcium carbid.

4. In a furnace, an iron tube, means for heating said tube, means for introducing material to be heated within said tube, a casing surrounding said tube and a packing between said tube and casing containing calcium carbid in granular form.

5. An electrical furnace, consisting of an iron tube, and a tubular casing surrounding said tube having end pieces centrally apertured to receive said tube, said tube being secured against longitudinal movement with respect to one of said end pieces and free to move in either direction through the other end piece.

6. In a furnace, an iron heating-chamber, means for heating said chamber, means for introducing material to be heated within said chamber and a heat-insulating packing surrounding said iron chamber and in contact therewith, said packing containing a carbid.

7. In a furnace, an iron heating-chamber, means for introducing material to be heated within said chamber, means for connecting said chamber to the source of current and a packing surrounding said chamber and containing calcium carbid in granular form.

8. In a furnace, an iron heating-chamber, means for introducing material to be heated within said chamber, means for heating said chamber, and a granular packing surrounding said chamber containing a substance which when heated by said chamber may decompose to form a reducing-gas in the interstices of said packing.

9. In a furnace, an iron heating-tube, means for connecting said tube to a source of current and a granular packing surrounding said tube, said packing containing a substance which when heated by said tube may reduce to a refractory oxid and a non-oxidizing gas.

10. In a furnace, a metallic heating-chamber, means for introducing material to be heated within said chamber, means for connecting said chamber to a source of current to heat the same and a granular packing surrounding said chamber containing a carbid which when heated by said tube may form a reducing-gas in the interstices of said granular packing and a refractory oxid inert to said metallic heating-chamber.

11. In a furnace, a hollow heating member, means for introducing material to be heated within said hollow member, means for heating said member, and a heat-insulating packing surrounding said member and in contact therewith, said packing containing a carbid.

12. In a furnace, an oxidizable heating member, means for passing current through said member to heat the same, means for introducing material to be heated within said member, and a heat-insulating packing containing calcium carbid surrounding said member to protect it from oxidation.

13. In a furnace, an oxidizable heating-chamber, means for connecting said chamber to a source of current, means for introducing material to be heated within said chamber, and a heat-resisting packing surrounding said chamber to protect it from the atmosphere, said packing containing calcium carbid in granular form.

In witness whereof I have hereunto set my hand this 27th day of October, 1902.

ERLAND ZELL.

Witnesses:
BENJAMIN B. HULL.
HELEN ORFORD.